United States Patent [19]

Kurata

[11] Patent Number: 5,633,962

[45] Date of Patent: May 27, 1997

[54] BIDIRECTIONAL OPTICAL SEMICONDUCTOR APPARATUS

[75] Inventor: Kazuhiko Kurata, Tokyo, Japan

[73] Assignee: NEC Corporation, Japan

[21] Appl. No.: 354,204

[22] Filed: Dec. 12, 1994

[30] Foreign Application Priority Data

Dec. 13, 1993 [JP] Japan ................... 5-311396

[51] Int. Cl.$^6$ ..................................... G02B 6/28
[52] U.S. Cl. ......................... 385/24; 385/14; 385/9; 385/41; 385/31; 359/143; 359/154
[58] Field of Search .................. 385/24, 14, 9, 385/39, 15, 41, 31, 42; 359/143, 154, 180, 188, 189, 195

[56] References Cited

U.S. PATENT DOCUMENTS 5,175,778  12/1992  Nourshargh et al. ............ 385/42
5,392,377  2/1995  Auracher ........................ 385/24

FOREIGN PATENT DOCUMENTS 4-51209  2/1992  Japan .

*Primary Examiner*—Phan T. H. Palmer

[57] ABSTRACT

The object is to reduce the size and losses of light transmitting/receiving modules. An optical transmitting/receiving module according to the invention comprises a light emitting element for sending out an optical signal of $\lambda_1$ in wavelength, a first optical waveguide into which this transmit optical signal is entered, and a second optical waveguide for sending out the transmit optical signal and receiving an optical signal of $\lambda_2$ in wavelength. Characteristically, it has a directional coupling section formed by arranging the first and second optical waveguides close to each other to be half as long as the full coupling length for a light having the wavelength of $\lambda_1$, and at the end of the directional coupling section are arranged a filter for reflecting the transmit optical signal of $\lambda_1$ in wavelength and transmitting the receive optical signal of $\lambda_2$ in wavelength, and a light receiving element, arranged on the opposite side to the optical waveguide substrate via the filter, for receiving the receive optical signal.

16 Claims, 2 Drawing Sheets

BIDIRECTIONAL OPTICAL SEMICONDUCTOR APPARATUS

BACKGROUND OF THE INVENTION

The present invention relates to a bidirectional optical transmitting/receiving apparatus, and more particularly to an optical transmitting/receiving apparatus in which a light source for optical transmission and a light receiving element for optical reception are integrated.

One of the most basic optical transmitting/receiving apparatuses for wavelength-division multiplex bidirectional transmission comprises a light emitting unit for converting electric signals into optical signals and sending the converted signals over an optical fiber, and a light receiving unit for receiving optical signals and converting them into electric signals. Also, the apparatuses provide an optical multiplexer/branching filter for combining the two sets of optical signals. However, if each individual unit is configured discretely, the whole system will become very large and, on account of the increased number of connections, its performance will deteriorate.

One of the known examples of conventional optical transmitting/receiving apparatuses reduced in size by integrating a light emitting element, a light receiving element and an optical multiplexer/branching filter is provided by the technique disclosed in the Japanese Patent Laid-open No. 51209 of 1992 (Reference). This optical transmitting/receiving apparatus uses different wavelengths $\lambda_1$ and $\lambda_2$ on the transmitting and receiving sides, respectively. The apparatus according to the configuration disclosed in the above-cited literature is smaller than earlier such apparatuses. This is because the light emitting element and the light receiving element are integrated over a substrate on which an optical waveguide and an optical multiplexer/branching filter are formed.

However, as the arrangement of the light emitting element and the light receiving element is not necessarily appropriate in the configuration described in the above-cited Reference. It will be explained in further detail below, the apparatus cannot deliver adequate performance because not only is the size reduction sufficient but also there is a substantial loss of light. Thus, in the configuration described in the Reference, which includes an optical multiplexer/branching filter and a directional coupler, the light of wavelength $\lambda_2$ incident from the transmission path invites multiplexing/branching losses in two positions. Moreover, since this light returns reflected by a reflective film, it has to travel over an optical waveguide length about double the overall length of the optical waveguide substrate. This further invites a greater optical waveguide loss, making it difficult to receive a light while maintaining a fixed reception level.

On the other hand, the optical fibers needed to be connected to the light emitting element package and the transmission path are arranged on opposite positions with the substrate in-between. For this reason, in a configuration wherein the light emitting element package and the optical waveguide are to be connected by short optical fibers, V-grooves or the like have to be formed on two sides of the substrate with resultant constraints on the size and ability to realize price reductions of the waveguide substrate.

Furthermore, a reflective film has to be arranged on the side on which a V-groove for laying the short optical fiber for connecting the light emitting element package is to be formed. This gives rise to the additional problem of greater complexity of configuration.

SUMMARY OF THE INVENTION

An object of the present invention is to provide a bidirectional optical transmitting/receiving apparatus which is simple in configuration, suitable for size and price reductions and, moreover, superior in performance to similar apparatuses according to the prior art.

An optical transmitting/receiving apparatus according to the invention is provided with a light emitting element for sending out a first optical signal. A first optical waveguide guides the first optical signal to a transmission path. Then, a second optical waveguide for guiding a second optical signal from the transmission path. Here, a directional coupler in which the first and second optical waveguides are arranged close to each other so that mode coupling arise. The directional coupler further has a directional coupling section which, consisting of a part of the directional coupler, approximately half as long as the full coupling length L of the directional coupler for a light having the wavelength of the first optical signal. At the end of the directional coupling section are arranged a filter, substantially vertically to the first and second optical waveguides. This section give reflecting at least a part of the first optical signal and transmitting at least a part of the second optical signal, and a light receiving element, arranged on the opposite side to the directional coupling section via the filter, for receiving the second optical signal.

According to the invention, optical waveguiding bodies includes optical waveguides formed on a substrate. Lights of substantially the same wavelengths are used for the first and second optical signals. At the end of the bodies half mirror is used as the filter, or lights of $\lambda_1$ and $\lambda_2$ in wavelength, $\lambda_2$ differing from $\lambda_1$, are used for the first and second optical signals, respectively and the filter is a wavelength filter which reflects the first optical signal on the light emitting side and transmits the second optical signal on the light receiving side. Or else, there is used a configuration in which the light emitting and light receiving elements and the optical waveguides are coupled on both the light emitting and light receiving sides either directly or via optical fibers.

According to the invention, more particularly, two optical waveguides may be arranged close to each other on a substrate to form a multiplexer/branching filter including a directional coupling section having a length equal to ½ of the full coupling length L for a light having the wavelength of $\lambda_1$. At the end of this directional coupling section, a filter is arranged for reflecting a light of $\lambda_1$ in wavelength and transmitting a light of $\lambda_2$ in wavelength. From a first optical waveguide is brought to incidence a transmitted light from a light emitting element to be shifted in the directional coupling section to a second optical waveguide by mode coupling. At the same time, to be returned by the filter in a position at half of the full coupling length of the directional coupler for full shifting to the second optical waveguide and eventually to be sent out on the transmission path through an optical fiber.

On the other hand, a receive light of $\lambda_2$ in wavelength, brought to incidence on the second optical waveguide from the transmission path through an optical fiber. Although a part of it shifts to the first optical waveguide in the directional coupling section, wholly reaches the filter, passes it and is coupled to a light receiving element arranged on the opposite side via the filter or an optical fiber of a greater core diameter connected thereto.

As described above, the light receiving element is arranged on the opposite side of the directional coupling section via a filter in the configuration of the present invention. Therefore, only two optical waveguides are required, one to be connected to the light emitting element and the other to be connected to the optical fiber on the transmission path side. Moreover, as the light emitting element and the optical fiber on the transmission path side are arranged on the same side with respect to the substrate, even if the conventional configuration of coupling the light emitting element and the optical waveguide via a V-groove is used. The substrate is made no more complex and can be reduced in size.

The reason why such a configuration is made possible is that a light receiving element, whose light receiving diameter is usually greater enough than the total width of the directional coupler composed of an optical waveguide or two optical waveguides arranged close to each other, can adequately receive light even if arranged on the side where a directional coupling section is formed.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENT

Figure 1:
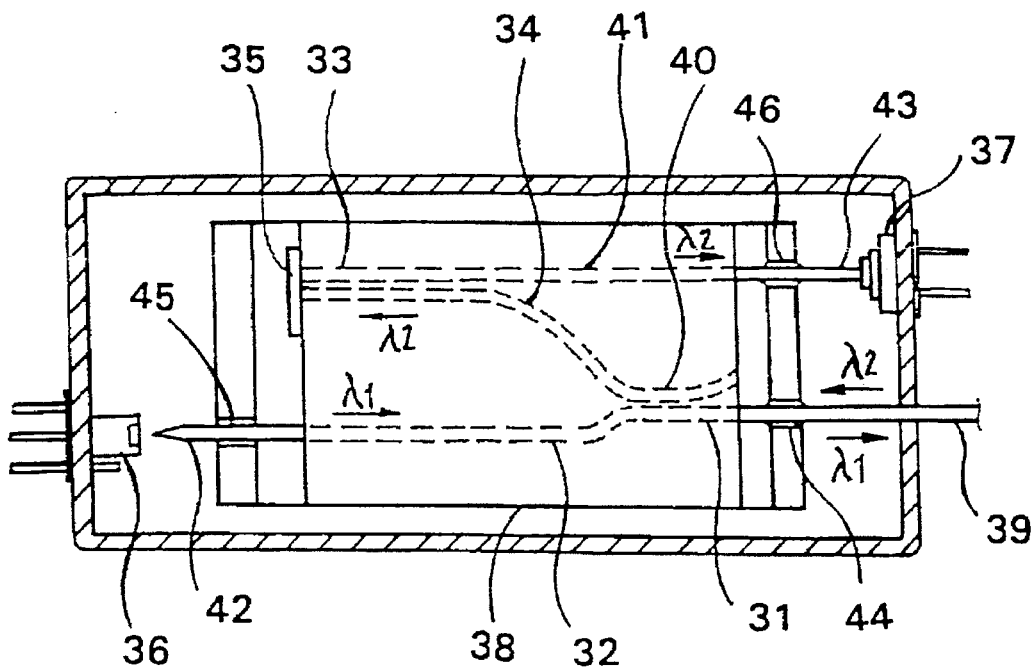
FIG. 1 is a configurational diagram of a light transmitting/ receiving apparatus for bidirectional transmission according to the prior art.

To facilitate better understanding of the present invention, the configuration of an optical transmitting/receiving apparatus for bidirectional transmission according to the prior art will be described first. FIG. 1 is a configurational diagram of a light transmitting/receiving apparatus for bidirectional transmission described in the above-cited literature.

In FIG. 1, on an optical waveguide substrate 38 are formed three optical waveguides including a light emitting-side optical waveguide 32, a light receiving-side optical waveguide 41 and an intermediate optical waveguide 34. Here, the light emitting-side optical waveguide 32 and the intermediate optical waveguide 34 have mutually adjacent parts, which constitute a multiplexer/branching filter section 40. This multiplexer/branching filter section 40 is set to have a length which is a full coupling length for a light of $\lambda_2$ in wavelength and in such a condition as will cause a light of $\lambda_1$ in wavelength to return to the original optical waveguide after once shifting to the other optical waveguide. The intermediate optical waveguide 34 and the light receiving-side optical waveguide 41 also have mutually adjacent parts, which constitute a directional coupling section 33 near one end of the optical waveguide substrate 38. Here, the directional coupling section 33 is cut to a length about equal to half the full coupling length for a light of $\lambda_2$ in wavelength, and a reflective film is arranged on the cut-off end face.

At one end of the light emitting-side optical waveguide 32 of the optical waveguide substrate 38 is formed a V-groove 45 in the substrate. A short optical fiber 42 is arranged over this V-groove 45. The light emitting element of a light emitting element package 36 and the light emitting-side optical waveguide 32 are optically coupled by another short optical fiber 43. Similarly, at one end of the light receiving-side optical waveguide 41 is formed another V-groove 46 in the substrate. Over this V-groove 46 is arranged the short optical fiber 43, which optically couples the light receiving-side optical waveguide 41 and the light receiving element of a light receiving element package 37. Still another V-groove 44 is formed at one end of a common optical waveguide 31, where an optical fiber 39 to be connected to the transmission path is arranged, and the common optical waveguide 31 and the optical fiber 39 are optically coupled.

In the above-described configuration, an optical signal of $\lambda_1$ in wavelength, coming incident on the light emitting-side optical waveguide 32 from the light emitting element package 36 via the short optical fiber 42, passes the multiplexer/ branching filter section 40 and the common optical waveguide 31. This signal is sent out to the optical fiber 39 connected to the transmission path. On the other hand, another optical signal of $\lambda_2$ in wavelength, coming incident from the transmission path via the optical fiber 39, is branched by the multiplexer/branching filter 40 and led to the intermediate optical waveguide 34. This signal, while passing the directional coupling section 33, is reflected by the reflective film 35 at the same time and, guided by the light receiving side optical waveguide 41, is brought to incidence on a light receiving element package 37 via an optical fiber 39.

In the structure described in the reference, the components of the signal of $\lambda_1$ in wavelength emitted from the light emitting element package 36 which are reflected by the boundary between the common optical waveguide 31 and the optical fiber 39 or reflected and return from the transmission path are scarcely coupled to the intermediate optical waveguide 34. However, mostly return to the light emitting-side optical waveguide 32. Even if there is a slight leak toward the intermediate optical waveguide 34, the signal of $\lambda_1$ in wavelength will be scarcely coupled to the light receiving-side optical waveguide 41, using a filter reflecting only a signal of $\lambda_2$ in wavelength but transmitting a signal of $\lambda_1$ in wavelength is used as the reflective film 35 arranged at one end of the directional coupling section 33. As crosstalk on the receiving side can be accordingly reduced to a minimum, this configuration is suitable for preventing the optical signal of $\lambda_1$ in wavelength, emitted from the light emitting element package 36, from leaking to the light receiving element package 37.

However, the above-described structure according to the prior art has the disadvantage that the light of $\lambda_2$ in wavelength, coming incident from the transmission path, is subject to multiplexing/branching losses in two constituent elements including the multiplexer/branching filter 40 and the directional coupler 33. Moreover, as this light is required to be reflected by the reflective film 35 and returned, it has to travel an optical waveguide length about double the overall length of the optical waveguide substrate 38. Consequently, it is also subject to a substantial optical waveguide loss, making it difficult to maintain a satisfactory reception level in receiving optical signals.

Furthermore, the light emitting element package 36 and the optical fiber 42 to be connected to the transmission path are arranged in opposite positions with the substrate 38 in-between. As a result, where the configuration is such that the light emitting element package and the optical waveguide are to be coupled by a short optical fiber as described in the Reference, V-grooves or the like have to be provided on both sides of the substrate with resultant constraints on the size and limitations on cost reductions of the waveguide substrate.

Moreover, in the above-described structure according to the prior art, the reflective film 35 has to be arranged on the same side on which the V-groove for laying the short optical fiber 42, to be used for coupling the light emitting element package 36, is to be formed. This entails the problem of a more complex configuration.

Figure 2:
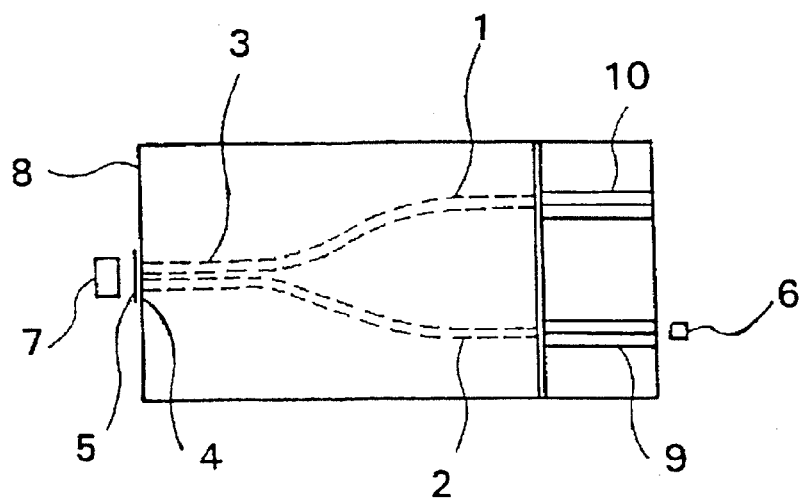
FIG. 2 is a basic configurational diagram illustrating only the optical elements of a light transmitting/receiving apparatus for bidirectional transmission, which is a preferred embodiment of the invention.

Next will be described in detail a preferred embodiment of the present invention. FIG. 2 is a basic configurational diagram illustrating only the optical waveguide substrate and optical elements, such as the light emitting element and light receiving element, of a light transmitting/receiving apparatus for bidirectional transmission, which is the preferred embodiment of the invention. A transmission path-side optical waveguide 1 and a light emitting-side optical waveguide 2 are so formed on an optical waveguide substrate 8 as to have mutually adjacent parts. A light travelling from the optical waveguide on one side goes through mode coupling to be shifted to the optical waveguide on the other side. This directional coupler has a full coupling length when its overall length is L for a light of $\lambda_1$ in wavelength. It is formed in such a condition that a light having travelled from the optical waveguide on one side fully shifts to the optical waveguide on the other side at this length. The directional coupler is cut off exactly at ½ of this full coupling length L, and an end face 4 of the optical waveguide substrate 8 is formed there. On this end face 4 is arranged a filter 5 which reflects a signal of $\lambda_1$ in wavelength, which is the transmit light, and transmits a signal of $\lambda_2$ in wavelength, which is the receive light, entered from the transmission path. Elements 9 and 10 are V-grooves for holding optical fibers, corresponding to the V-grooves 44 and 46 in prior art FIG. 1.

In the above-described configuration, the transmit light, emitted from a light emitting element 6 and having travelled over the light emitting-side optical waveguide 2, is gradually shifted, as it reaches the directional coupler constituting a multiplexer/branching filter section 3, to the transmission path-side optical waveguide 1 by mode coupling. By the time this light reaches the vicinity of the filter 5, about half of it has completed the shift. There it is wholly reflected by the filter 5, and the rest of the light is further shifted to the transmission path-side optical waveguide 1. Ultimately, all of this light is shifted to the transmission path-side optical waveguide 1.

On the other hand, a light of $\lambda_2$ in wavelength, which is the receive light having come incident from the transmission path-side optical waveguide 1, is partly shifted to the light emitting-side optical waveguide 2 as it reaches the multiplexer/branching filter section 3. Here, as the wavelength of the receive light differs from $\lambda_1$, it shifts in a different way from the transmit light. Therefore, by the time it reaches the wavelength filter 5, half of it has not necessarily shifted to the light emitting element-side optical waveguide 2. However, irrespective of the state of mode coupling in the multiplexer/branching filter section 3, the receive light having reached the filter 5 is transmitted by the filter 5 and brought to incidence on a light receiving element 7. Usually, the light receiving diameter of a light receiving element is not less than 30 µm, and the total width of the multiplexer/branching filter section 3, including the two optical waveguides, is about 30 µm. Therefore, regardless of the state of mode coupling of the receive light in the multiplexer/branching filter section 3, substantially all of the light having passed the filter 5 is received by the light receiving element 7.

Figure 3:
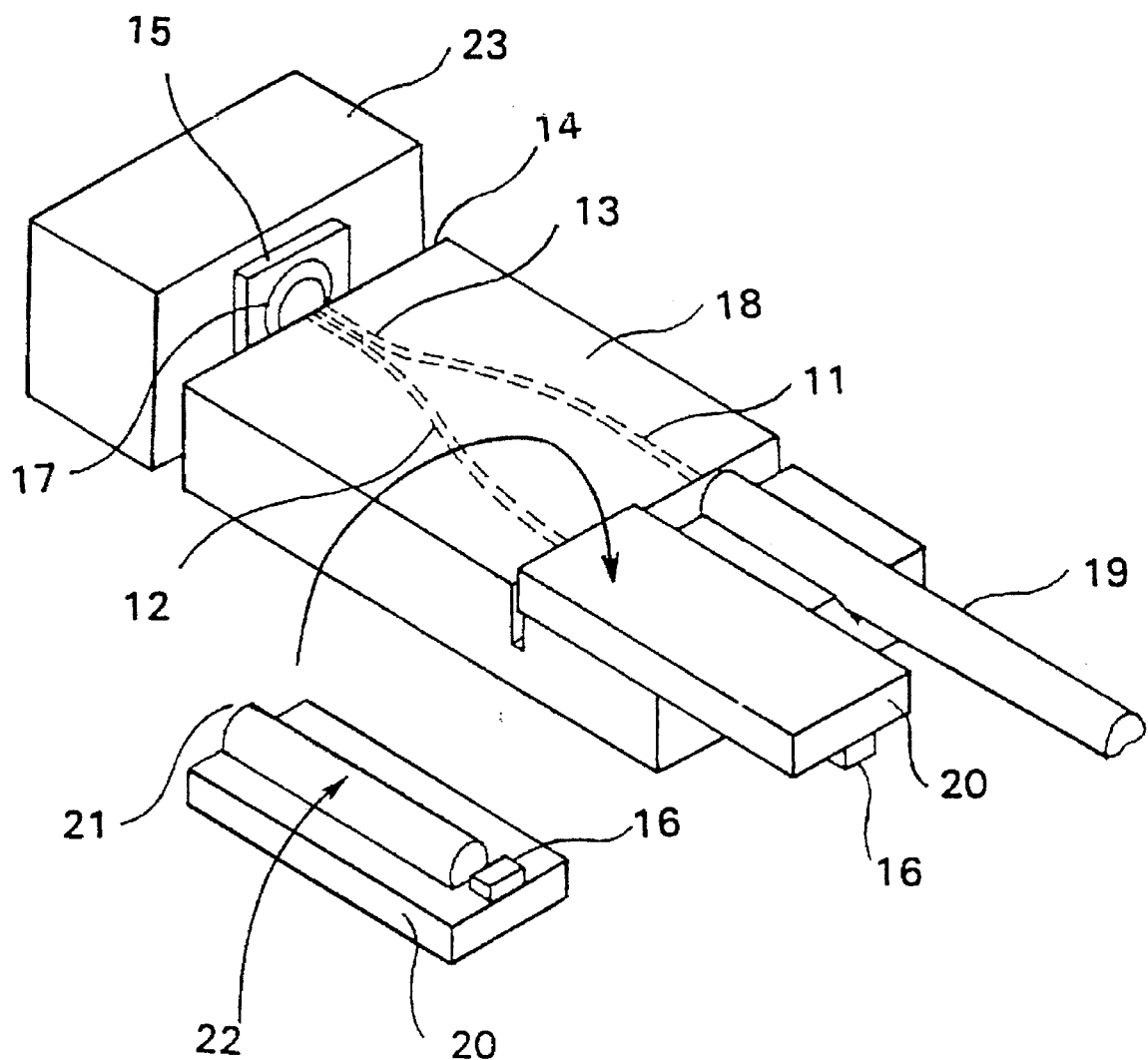
FIG. 3 shows a perspective view of the light transmitting/ receiving apparatus for bidirectional transmission, which is a preferred embodiment of the invention.

FIG. 3 shows a perspective view of the light transmitting/ receiving apparatus for bidirectional transmission, which is a preferred embodiment of the invention. The light transmitting/receiving apparatus for bidirectional transmission illustrated in FIG. 3 is a bidirectional light transmitting/ receiving apparatus for double wavelength division multiplexing having a function to send out optical signals of 1.31 µm in wavelength and receiving optical signals of 1.55 µm in wavelength.

On an optical waveguide substrate 18, made of silicon, is accumulated $SiO_2$ by chemical vapor deposition (CVD), and further is stacked a high refractive index portion (not shown) doped with germanium which will constitute the core, to form a transmission path-side optical waveguide 11 and a light emitting-side optical waveguide 12. The transmission path-side optical waveguide 11 and the light emitting-side optical waveguide 12 have, on one side of the optical waveguide substrate 18, a multiplexer/branching filter section 13 consisting of mutually adjacent parts of the two optical waveguides.

On the opposite side to this multiplexer/branching filter 13 are formed, in the face of the optical waveguide substrate 18, two V-grooves (not shown) by optical anisotropic etching. In one of these V-grooves is so arranged and fixed an optical fiber 19, which is to be connected to the transmission path, that its core and the core of the transmission path-side optical waveguide be optically coupled by positionally matching the former with the latter. In the other V-groove is arranged an optical coupling unit consisting of a coupling short optical fiber 21, arranged in advance on a silicon base consisting of another silicon substrate. A semiconductor laser diode 16 is fixed to the silicon base to be optically coupled to it. A light emitted from the semiconductor laser diode 16 is once coupled to the coupling short optical fiber 21. Then, optically coupled to the light emitting-side optical waveguide 12 via the short optical fiber 21.

In the multiplexer/branching filter section 13 is formed a directional coupler in such a condition that its length constitutes a full coupling length L for a light of $\lambda_1$ in wavelength, which is the wavelength of the transmit light. In the position of ½ of the full coupling length is formed an end face 14. To this end face 14 is adhered with resin a filter 35 which reflects the light of $\lambda_1$ in wavelength ($\lambda_1$=1.31 µm) and transmits a light of $\lambda_2$ in wavelength ($\lambda_2$=1.55 µm), which is the receive light. This filter 35 consists of a dielectric multi-layer film filter, vapor-deposited on BK7 glass. This configuration allows the light of $\lambda_1$ in wavelength having reached the multiplexer/branching filter 3 to be almost wholly returned to the other optical waveguide partly by shifting through mode coupling and partly by reflection by the the filter 35. Meanwhile, even though a part of the light of $\lambda_2$ in wavelength may shift to the other optical waveguide through mode coupling, eventually almost the whole light is transmitted by the filter 35.

On the opposite side to the optical waveguide substrate 18, with the filter 35 in-between, there is arranged an InGaAs-APD (3-element APD) 17, fixed to a block 23. The light receiving diameter of this 3-element APD 17 is about 50 µm, large enough to effectively receive substantially all of the light having passed the filter 35.

Here, said optical waveguides are so formed that the multiplexer/branching filter section 13 have a core size of 4 µm, a clad refractive index of 1.469 and a specific refractive index difference of 0.25%. If the clearance between the optical waveguides in the multiplexer/branching filter section 13 is 10 um, the full coupling length L of the light receiving element for a wavelength of 1.31 μm will be about 9 mm. Therefore, the length of the multiplexer/branching filter section 13 in the configuration of this embodiment is about 4.5 mm, equal to ½ of that full coupling length. Or, if the radius of curvature of each optical guide is 10 mm and the clearance between the transmission path-side optical waveguide 11 and the light emitting-side optical waveguide 12 is set to be 2 mm, the length from the end face to the multiplexer/branching filter 13 will be about 8.7 mm. The overall length of the optical waveguide substrate 18, even if the length of the multiplexer/branching filter 13 and the 4 mm length of the V-groove portion are added to this 8.7 mm, will be 17.2 mm. This length is about 10 mm shorter than any prior art configuration designed to meet the same requirements.

The above-describec configuration of one embodiment of the present invention makes it possible for optical signals of $\lambda_1$ in wavelength to be sent out to the transmission path and optical signals of $\lambda_2$ in wavelength, coming incident from the transmission path, to be received. It involves a smaller number of optical waveguides formed on the optical waveguide substrate than in any light transmitting/receiving apparatus according to the prior art. Moreover, it allows losses to be reduced because of the smaller number of positions where reflection or multiplexing/branching takes place. Furthermore, since the V-grooves in which to arrange the short optical fiber on the light emitting element side and the optical fiber to be connected to the transmission path can be formed on the same side of the optical waveguide substrate, the whole apparatus can be reduced in size.

Next will be described conceivable variations of the light transmitting/receiving apparatus according to the present invention. Although a semiconductor laser diode is used as the light emitting element for the light transmitting/receiving apparatus in the above-described embodiment of the invention, a light emitting diode may as well be used as the light source. Furthermore, instead of integrating the light emitting element into the apparatus, the transmit light may as well be entered from outside via an optical fiber connected to the light emitting-side optical waveguide. Similarly on the light receiving side, instead of arranging the light receiving element directly, it may as well be coupled once to an optical fiber and then, via this optical fiber, to the apparatus. In this case, however, efficient coupling of the light having passed the filter to the optical fiber would require the use of a thick optical fiber whose diameter is at least as great as the combined width of the two optical waveguides. These waveguides are formed approximately equal in core diameter.

Whereas the above-described embodiment of the invention is a bidirectional light transmitting/receiving apparatus for double wavelength division multiplexing using lights of two different wavelengths, its configuration may be replaced with one having a half mirror instead of the filter 35 and using lights of the same wavelength as the transmit light and the receive light. In this case, a light transmitting/receiving apparatus according to the invention can have a configuration for semi-double bidirectional transmission to separate transmission and reception on a time scale.

As a half mirror is used instead of a filter in the apparatus of the above-described configuration, a part of the transmit light emitted from the semiconductor laser diode passes the half mirror and is received by the light receiving element. It also is possible to monitor the intensity of this light for controlling the optical output of the semiconductor laser diode. This arrangement would dispense with the photodiode for monitoring with the emitted light from behind the semiconductor laser diode used according to the prior art.

Generally, where a semiconductor laser diode is used as the light emitting element, returning lights reflected by a short face of the substrate, a connection point or the like may come incident again on the semiconductor laser diode to destabilize its oscillation. In the configuration of the light transmitting/receiving apparatus according to the invention, a predominant part of the light emitted from the semiconductor laser diode is reflected by the filter or half mirror at one end face of the optical waveguide via the multiplexer/branching filter, and coupled to the transmission path-side optical waveguide. If isolation by the multiplexer/branching filter is inadequate, a part of the light may be coupled to the light emitting-side, instead of the transmission path-side, optical waveguide, and return to the semiconductor laser diode again. However, in the above-described embodiment of the invention, it is confirmed that isolation by the multiplexer/branching filter is 30 dB or more and the reflected returning light poses no problem at all in transmission at a rate in the order of hundreds of MHz.

As hitherto described, in the light transmitting/receiving apparatus according to the present invention, a multiplexer/branching filter consisting of a directional coupling section is formed by arranging parts of two optical waveguides, the transmitting path-side optical waveguide and the light emitting element-side optical waveguide, close to each other. An end face is formed in the position of ½ of the full coupling length for a light of $\lambda_1$ in wavelength, which is the transmit light. On this end face is arranged a wavelength filter which reflects only a light of $\lambda_1$ in wavelength and transmits a light of $\lambda_2$ in wavelength. This configuration makes it possible to accomplish multiplexing/branching in a short travelling distance on the optical waveguide substrate to send out the transmit light and to lead the receive light from the transmission path to the light receiving element. It results in a corresponding reduction in propagation loss. Moreover, the light emitting element and the optical fiber to be connected to the transmission path are arranged on the same side with respect to the optical waveguide substrate. Therefore, the substrate can be reduced in size and cost even if a V-groove or the like is used for coupling to the light emitting element.

What is claimed is:

1. An optical transmitting/receiving apparatus for bidirectional transmission comprising:

means for sending out a first optical signal, a first optical waveguiding body for guiding the first optical signal to a transmission path;

means for receiving a second optical signal, a second waveguiding body for guiding said second optical signal from said transmission path;

a directional coupler in which said first and second optical waveguiding bodies are arranged close to each other so that mode coupling arises, said directional coupler including a directional coupling section comprising a part of said directional coupler, said directional coupling section being approximately half as long as a full coupling length L of said directional coupler for light having a wavelength of said first optical signal;

a filter, arranged at the end of said directional coupling section substantially vertically to said first and second optical waveguides, for reflecting at least a part of said first optical signal and transmitting at least a part of said second optical signal; and light receiving means, arranged on a side opposite to said directional coupling section via said filter, for receiving said second optical signal.

2. An optical transmitting/receiving apparatus for bidirectional transmission, as claimed in claim 1, wherein:

said filter is a half mirror for reflecting at least a part of said first optical signal and transmitting at least a part of said second optical signal.

3. An optical transmitting/receiving apparatus for bidirectional transmission, as claimed in claim 1, wherein:

said first optical signal is a light of $\lambda_1$ in wavelength and said second optical signal is a light of $\lambda_2$ in wavelength differing from $\lambda_1$, and said filter is a wavelength filter which reflects a light of $\lambda_1$ in wavelength and transmits a light of $\lambda_2$ in wavelength.

4. An optical transmitting/receiving apparatus for bidirectional transmission, comprising:

means for sending out a first optical signal, a first optical waveguiding body for guiding the first optical signal to a transmission path;

means for receiving a second optical signal, a second waveguiding body for guiding said second optical signal from said transmission path;

a directional coupler in which said first and second optical waveguiding bodies are arranged close to each other so that mode coupling arise, a directional coupling section comprising a part of said directional coupler, approximately half as long as the full coupling length L of said directional coupler for a light having the wavelength of said first optical signal;

a filter, arranged at the end of said directional coupling section substantially vertically to said first and second optical waveguides, for reflecting at least a part of said first optical signal and transmitting at least a part of said second optical signal; and means, arranged on the opposite side to said directional coupling section via said filter, for receiving said second optical signal;

wherein:

said first and second optical waveguiding bodies are first and second optical waveguides, respectively, formed on the same substrate; and said directional coupling section consists of said first and second optical waveguides formed close to each other on said substrate.

5. An optical transmitting/receiving apparatus for bidirectional transmission comprising:

means for sending out a first optical signal;

a substrate including a first optical waveguide for entering said first optical signal, a second waveguide for sending out said first optical signal and receiving a second optical signal, and a directional coupling section formed by arranging said first and second optical waveguides close to each other so as to be approximately half as long as the full coupling length L for a light having the wavelength $\lambda_1$ of said first optical signal; and a half mirror, arranged at the end of said directional coupling section, for reflecting at least a part of said first optical signal and transmitting at least a part of said second optical signal;

an optical fiber to be connected to said second optical guide; and means, arranged on the opposite side to said section formed by arranging said first and second optical waveguides via said half mirror, for receiving said second optical signal.

6. An optical transmitting/receiving apparatus for bidirectional transmission, as claimed in claim 5, wherein:

said means for sending out said first optical signal of $\lambda_1$ in wavelength to said first optical waveguide is a semiconductor laser diode.

7. An optical transmitting/receiving apparatus for bidirectional transmission, as claimed in claim 5, wherein:

said means for sending out said first optical signal of $\lambda_1$ in wavelength to said first optical waveguide is an optical fiber connected to a light source for sending out said optical signal of $\lambda_1$ in wavelength.

8. An optical transmitting/receiving apparatus for bidirectional transmission, as claimed in claim 5, wherein:

said section formed by arranging said first and second optical waveguides close to each other, connected to a light receiving element for receiving said optical signal of $\lambda_2$ in wavelength, is an optical fiber having a core width greater than the combined width of said first and second optical waveguides.

9. An optical transmitting/receiving apparatus for bidirectional transmission, as claimed in claim 5, wherein:

said means for receiving said second optical signal is a light receive element for receiving said optical signal of $\lambda_2$ in wavelength.

10. An optical transmitting/receiving apparatus for bidirectional transmission, as claimed in claim 5, wherein:

said means for sending out said first optical signal of $\lambda_1$ in wavelength to said first optical waveguide is a light emitting diode.

11. An optical transmitting/receiving apparatus for bidirectional transmission comprising:

means for sending out a first optical signal of $\lambda_1$ in wavelength;

a substrate including a first optical waveguide for entering said first optical signal, a second waveguide for sending out said first optical signal and receiving a second optical signal of $\lambda_2$ in wavelength, and a directional coupling section formed by arranging said first and second optical waveguides close to each other so as to be approximately half as long as the full coupling length L for a light having the wavelength $\lambda_1$ of said first optical signal; and a filter, arranged at the end of said directional coupling section, for reflecting at least a part of said first optical signal of $\lambda_1$ in wavelength and transmitting at least a part of said second optical signal of $\lambda_2$ in wavelength;

an optical fiber to be connected to said second optical guide; and means, arranged on the opposite side to said section formed by arranging said first and second optical waveguides via said filter, for receiving said second optical signal.

12. An optical transmitting/receiving apparatus for bidirectional transmission, as claimed in claim 6, wherein:

said means for sending out said first optical signal of $\lambda_1$ in wavelength to said first optical waveguide is a light emitting diode.

13. An optical transmitting/receiving apparatus for bidirectional transmission, as claimed in claim 11, wherein:

said means for sending out said first optical signal of $\lambda_1$ in wavelength to said first optical waveguide is a semiconductor laser diode.

14. An optical transmitting/receiving apparatus for bidirectional transmission, as claimed in claim 11, wherein:

said section formed by arranging said first and second optical waveguides close to each other, connected to a light receiving element for receiving said optical signal of $\lambda_2$ in wavelength, is an optical fiber having a core width greater than the combined width of said first and second optical waveguides.

15. An optical transmitting/receiving apparatus for bidirectional transmission, as claimed in claim 11, wherein:

said means for sending out said first optical signal of $\lambda_1$ in wavelength to said first optical waveguide is an optical fiber connected to a light source for sending out said optical signal of $\lambda_1$ in wavelength.

16. An optical transmitting/receiving apparatus for bidirectional transmission, as claimed in claim 11, wherein:

said means for receiving said second optical signal is a light receive element for receiving said optical signal of $\lambda_2$ in wavelength.

\* \* \* \* \*